Aug. 6, 1957 A. W. BLYTHE 2,801,841
COIL SPRING BOOSTER
Filed Feb. 16, 1954
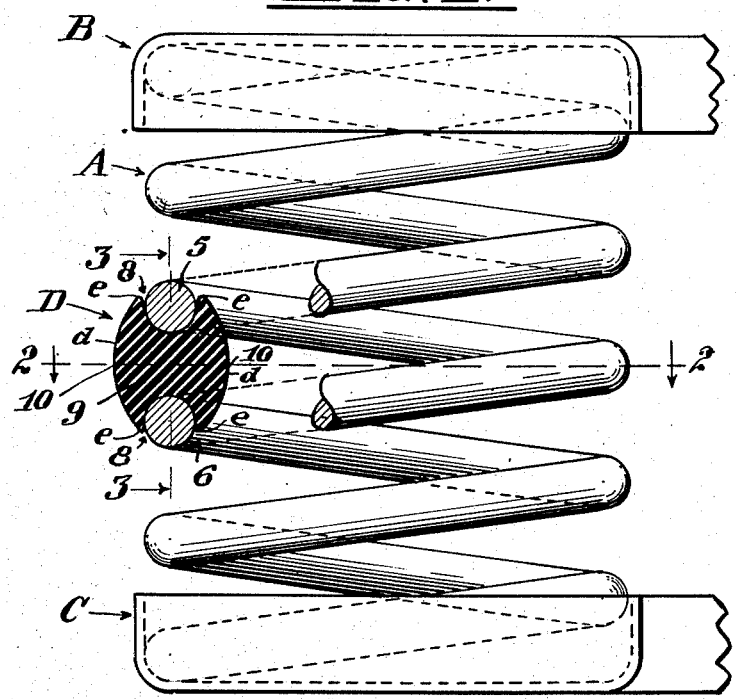
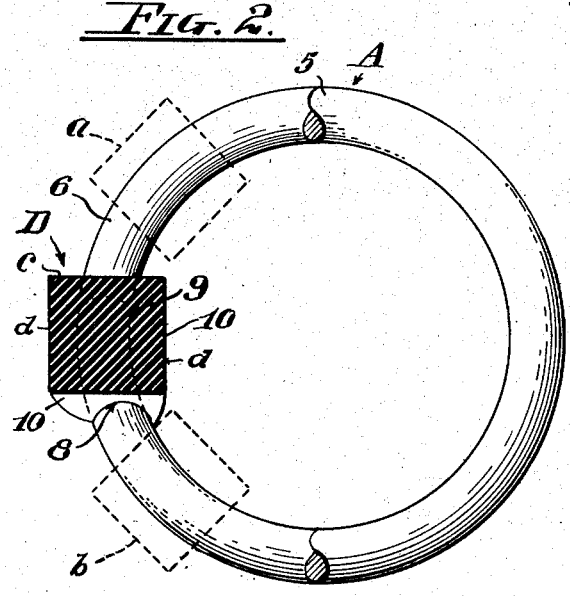
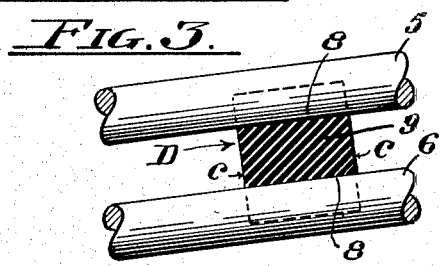
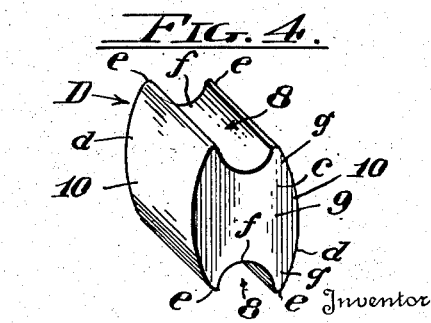
Inventor
Allen W. Blythe;
By R. S. Berry
Attorney United States Patent Office 2,801,841
Patented Aug. 6, 1957

2,801,841

COIL SPRING BOOSTER

Allen W. Blythe, South Gate, Calif.

Application February 16, 1954, Serial No. 410,692

1 Claim. (Cl. 267—33)

This invention relates to a booster for coil springs and has as its primary object the provision of an article of manufacture adapted for use in eliminating the sag of coil springs particularly where employed between the frame and axles of motor vehicles so as to remedy faulty conditions developed by such sag and to restore the springs to normal operation after having become set in a distorted position.

Another object is to provide a booster for the coil springs of motor vehicles whereby the body of the vehicle may be raised relative to the vehicle axles to factory required height and whereby vehicle shock absorbers displaced by sag of coil springs may be restored to normal operation position.

Another object is to provide a means for stabilizing coil springs on the front or rear portions of a motor vehicle in such manner as to eliminate excessive bouncing of the vehicle wheels when traversing rough roads which bouncing causes an undesirable unbalanced condition.

Another object is to provide a means for yieldably opposing compression of the outer side portions only of vehicle coil springs so as to reduce swaying or leaning of vehicle bodies when traversing curves thereby keeping the vehicle on evener keel.

Another object is to provide an attachment for coil springs which is particularly serviceable in eliminating the sag of coil springs employed on the front end of a motor vehicle, which sag is known to cause mis-alignment of the front wheels of the vehicle resulting in excessive tire wear, hard steering, and poor tracking.

Another object is to provide a coil spring booster comprising a body of hard but resilient material, such as vulcanized rubber or synthetic rubber, which body is adapted to be inserted between contigous convolutions of a spring in seated engagement with fractional portions of the lengths thereof, and which body is adapted to yieldably spread apart the convolutions engaged thereby.

A further object of this invention is to provide a spring stiffener in the form of a wedge body which can be inserted either singly or in multiple between adjacent coils of a coiled compression spring to control the shortening of the spring under compression with the stiffener extending along a small portion only of the length of the spring coil and having a thickness slightly exceeding the space between the coils abutted thereby to have a spreading action thereon and which will act to restrain two adjacent coils of the spring against movement toward each other beyond a predetermined spacing.

A further object is to provide the booster with channeled seats on opposite ends thereof so formed as to engage the coils of a spring in a fashion to insure retention of the stiffener in place between the coils and to prevent shifting of the stiffener along the lengths of the coils.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 1 is a view in elevation partly in section of a coil spring as mounted between the frame and the axle of a motor vehicle, showing the booster as applied;

Fig. 2 is a view in horizontal section partly in plan as seen on the line 2—2 of Fig. 1;

Fig. 3 is a view in section and elevation taken on the line 3—3 of Fig. 1; and

Fig. 4 is a perspective view of the booster as detached showing it of general ellipsoidal form with rectilineal end channels.

Referring to the drawings more specifically A indicates a coil spring here shown as comprising a heavy duty type of coil spring employed in motor vehicles where the spring is arranged vertically and is interposed between the frame and axle of the vehicle with its upper end seated in an inverted pocket B on the vehicle frame and with its lower end seated in a pocket C carried on the vehicle axle. In some motor vehicles a pair of such springs is employed only on the front axle with a spring disposed adjacent each end of the axle and the forward end portions of the side members of the vehicle frame, while other vehicles are also equipped with a pair of the coil springs interposed between the end portions of the rear axle and the rear end portions of the vehicle frame.

In carrying out the invention a spring stiffener or booster D is provided for interposition between adjacent convolutions 5—6 of the spring A at a point where weakness or sag of the spring is indicated or where it is found desirable to fortify or stabilize a portion of the spring. In the coil springs of vehicles the weakened portion or sag of the spring, or the portions thereof that requires stabilizing or boosting is ordinarily the outer side portion of the spring which is generally subjected to more frequent or more forceful compressions than the inner side portions thereof. The booster D is therefore formed of minor length as compared to the length of the convolutions of a coil spring to which the booster is to be applied and not appreciably greater than its own width so as to extend longitudinally of the spring convolutions along only a fractional portion thereof and so as to oppose relative compression of adjacent convolutions along only a short length thereof where a single booster is employed; it being contemplated however to apply two or more of the boosters as indicated in dotted lines a—b in Fig. 2 where a greater spread of the boosting or stiffening action is required.

As here shown the booster is formed so that its transverse length at least approximates that of its transverse width at its mid section but manifestly its length may be appreciably less than its width if desired.

The booster D is formed of hard but resilient material having limited compressibility such as vulcanized rubber or synthetic rubber. It may be of any general contour since its particular configuration is not essential other than that which will afford substantial body thickness intermediate its ends and that its upper and lower end portions be contoured to provide seats for contiguous convolutions of a coil spring to which the booster is to be applied. As shown in Figs. 1 to 4 the booster is formed with opposed flat side faces c—c and opposed convex or arcuate side faces d—d which latter terminate in ridges e—e constituting the margins of the side walls of elongated channels 8—8 formed on the upper and lower ends of the booster and which channels constitute seats for contiguous spring convolutions 5—6. The channels 8—8 extend entirely across the ends of the booster and open at the opposed side walls c—c. The bottom wall portions f of the channels are of arcuate cross section and are of a width to at least substantially conform to the contiguous peripheral portions of the spring coils seated therein and whereby the booster when interposed between the adjacent coils will be securely held in place.

However, in order to insure a gripping action of the outer marginal wall portion of the channels on the opposite sides of a coil, the channels are formed of a width slightly less than the diameter of the wire of which the coil is formed so as to be spread apart and thereby be placed under compression when coils are seated under pressure in the channels.

As a further means for affording a gripping action of the booster on a coil to insure against creeping of the booster lengthwise of the coils, the channels 8—8 are preferably longitudinally rectilineal so that when applied to a longitudinally arcuate portion of a coil the latter will deform the walls of the channels laterally to follow the longitudinal curvature of the coil thus placing the end portions of the walls of the channels under transverse compression thereby tending to grip the coils which with the pressure of the spring on the booster will securely hold it in place.

The intermediate body portion 9 of the booster extending between the inner or bottom portions of the channels 8—8 is unrestricted and is dimensioned to have a height slightly exceeding the normal distance between adjacent convolutions of the spring to which the booster is to be applied and of a width substantially greater than the diameter of the wire forming the spring convolutions; and is sufficiently resistant to compression that when the booster is interposed between the spring convolutions the latter will be tensioned so as to tightly grip the booster. The booster is also sufficiently resistant to compression without restriction that where the spring is sagged the booster will act when in place in the sagged portion of the spring to spread the adjacent convolutions to their normal relative position, or even slightly beyond such position if need be, and to so hold the convolutions under a load imposed thereon, thereby stabilizing the spring and compensating for weakness or sag therein at the portions thereof to which the booster is applied.

The body or block constituting the booster is formed of a width between the convex faces d—d such as to afford a stress-absorbing portion protruding or bulging outwardly at each side of the spring coils between which it is interposed with a maximum protrusion 10 at its intermediate portion 9 midway of the length of the booster so as to lie intermediate adjacent coils and from which the booster tapers inwardly on a convex curvature to the ends of the booster defined by the margins e—e of the channels 8—8 whereby the side walls of the channels 8—8 will diverge with gradually increasing thickness from their margins e—e as indicated at g so as to oppose spreading of such walls and also absorb stress. The maximum protrusions 10 relative to the margins of the channels 8—8 is proximate to the width of the arcuate bottom portions of the channels 8—8 and the channels are of a length such that the ends thereof will be spaced apart a distance less than or proximate the maximum width of the body or block.

In applying the booster to a spring the convolutions of the spring between which the booster is to be positioned are spread apart by means of a suitable tool to permit insertion of the booster.

In the operation of the invention the booster will manifestly act when applied between adjacent coils of a spring to yieldably oppose relative movement toward each other of the adjacent coils of the spring engaging the booster, thereby strengthening the spring and effecting a stiffening action thereon at the point or points of application of the booster.

Manifestly any number and arrangement of the boosters may be applied to a single coil spring as occasion may require in order to effect the desired stiffening of the spring at weak points along the lengths of the convolutions thereof.

I claim:

The combination with a coil spring embodying overlying spaced apart longitudinally curved convolutions, a solid block of hard but resilient material interposed between adjacent of said convolutions and having opposed ends on which said convolutions seat and having a minor length relative to the length of the spring convolutions and having open ended channels of arcuate cross section formed in said opposite ends and extending the entire length thereof in which the adjacent spring convolutions seat; said channels being normally rectilineal with parallel resiliently resistant side walls which when applied to the spring convolutions are laterally deformed and snugly conform under transverse tension to the curvature of the spring convolutions seated therein in gripping engagement therewith.

References Cited in the file of this patent

UNITED STATES PATENTS

| | | |
|---|---|---|
| 1,566,026 | Liepert et al. | Dec. 15, 1925 |
| 1,639,636 | Blomgren | Aug. 16, 1927 |
| 1,679,698 | Weydert | Aug. 7, 1928 |
| 1,928,536 | Heinlen et al. | Sept. 26, 1933 |
| 2,230,340 | Shreffler | Feb. 4, 1941 |
| 2,673,084 | Blythe | May 23, 1954 |